United States Patent [19]

Yamashita

[11] 4,403,721
[45] Sep. 13, 1983

[54] VARIABLE DIAMETER DRUM

[76] Inventor: Kyoichi Yamashita, 2361 Nippa-cho, Kohoku-ku, Yokohama-shi, Kanagawa 223, Japan

[21] Appl. No.: 270,979

[22] Filed: Jun. 5, 1981

[51] Int. Cl.³ .................. B65H 17/20; B23B 31/40
[52] U.S. Cl. ......................... 226/191; 242/68.2; 242/72.1; 279/2 R
[58] Field of Search ........... 242/72.1, 110, 72 R, 242/72 B; 226/191; 279/2 A, 2 R

[56] References Cited

U.S. PATENT DOCUMENTS

| | | | |
|---|---|---|---|
| 612,910 | 10/1898 | Moran et al. | 242/72 R |
| 1,466,121 | 8/1923 | Dallas | 242/72.1 |
| 2,526,772 | 10/1950 | Reynolds | 279/2 R X |
| 2,717,128 | 9/1955 | Heizer | 242/72.1 |
| 2,904,279 | 9/1959 | Ewing | 242/72.1 |
| 2,928,621 | 3/1960 | Cohn | 242/72.1 |
| 2,942,892 | 6/1960 | Nelson | 242/72.1 X |
| 3,997,176 | 12/1976 | Wyckoff et al. | 242/72.1 X |

FOREIGN PATENT DOCUMENTS 855511 12/1960 United Kingdom ............ 242/72.1

*Primary Examiner*—Stuart S. Levy
*Assistant Examiner*—Scott J. Haugland
*Attorney, Agent, or Firm*—Armstrong, Nikaido, Marmelstein & Kubovcik

[57] ABSTRACT

A variable diameter drum for driving perhaps other drums which includes a rotating shaft, and a plurality of cylinder segments circumferentially arranged around the shaft. Each cylinder segment has an outer arc surface with the outer arc surfaces of all of the cylinder segments forming a substantially continuous surface when the segments are joined together. The segments are held from axially and circumferentially moving, but can move radially. A frusto-conical barrel and an adjustable collar are arranged interiorly of the segments to provide and control their radial positions.

6 Claims, 2 Drawing Figures

VARIABLE DIAMETER DRUM

BACKGROUND OF THE INVENTION

This invention relates to a variable diameter drum.

Drums are often used to transmit a force to another drum or roller. Two drums can be in pressure contact between which a tape is transported. Such a drum generally has a fixed diameter or circumference. If a driving drum has a diameter or circumference which is variable, then the revolution of the driven drum may be varied or the feed rate of tape which is transported between the drums may be varied. Such a drum system has a wider variety of applications.

Therefore, an object of the present invention is to provide a drum which has a diameter or circumference which is variable.

SUMMARY OF THE INVENTION

According to the present invention, there is provided a variable diameter drum which comprises a rotating shaft; a plurality of cylinder segments circumferentially arranged around the shaft and each having an outer arc surface, the outer arc surfaces of the cylinder segments forming a continuous cylindrical surface when the cylinder segments are joined together; means for holding the cylinder segments, but allowing the cylinder segments to translate radially; and means for adjusting the radial position of the cylinder segments.

BRIEF DESCRIPTION OF THE DRAWINGS

The above and other objects and advantages of the invention will be better understood by reference to the description, taken in connection with the accompanying drawings, in which.

DESCRIPTION OF THE PREFERRED EMBODIMENT

Figure 1:
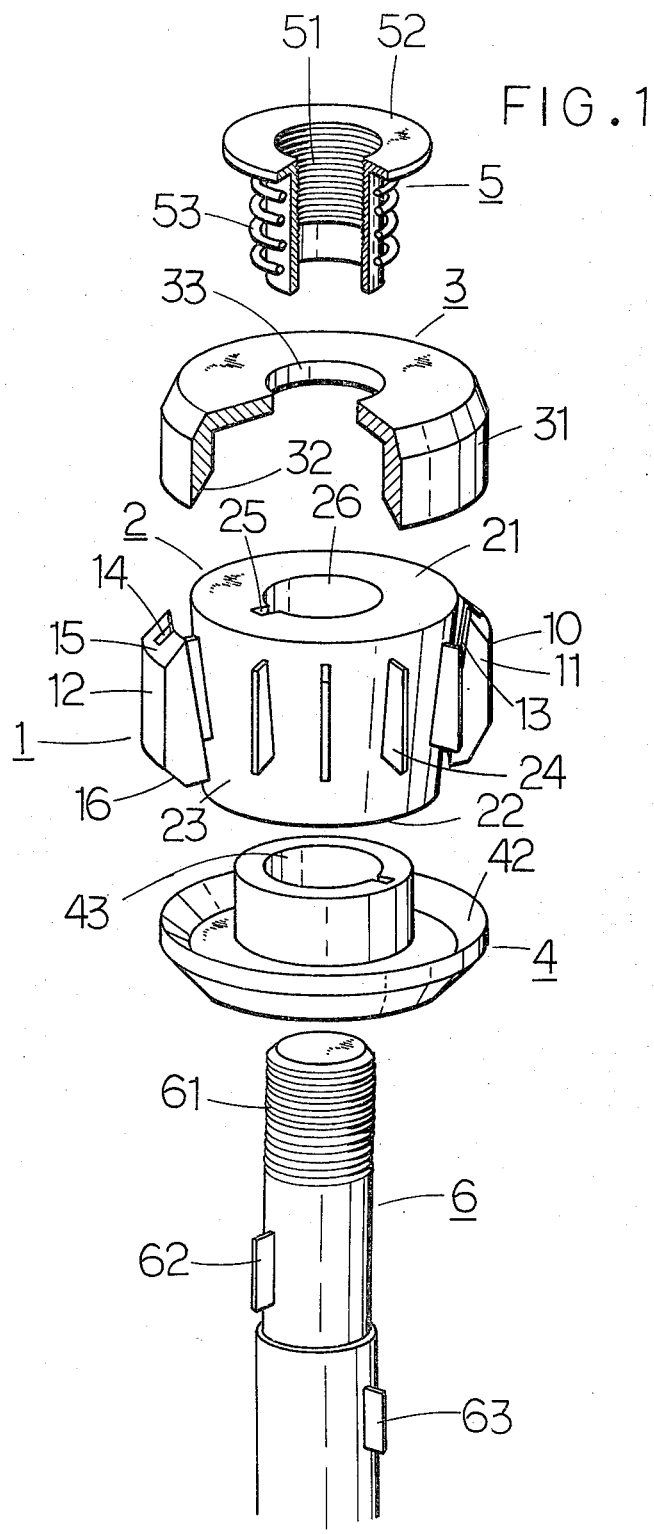
FIG. 1 is an exploded view of the variable diameter drum according to the invention.
Figure 2:
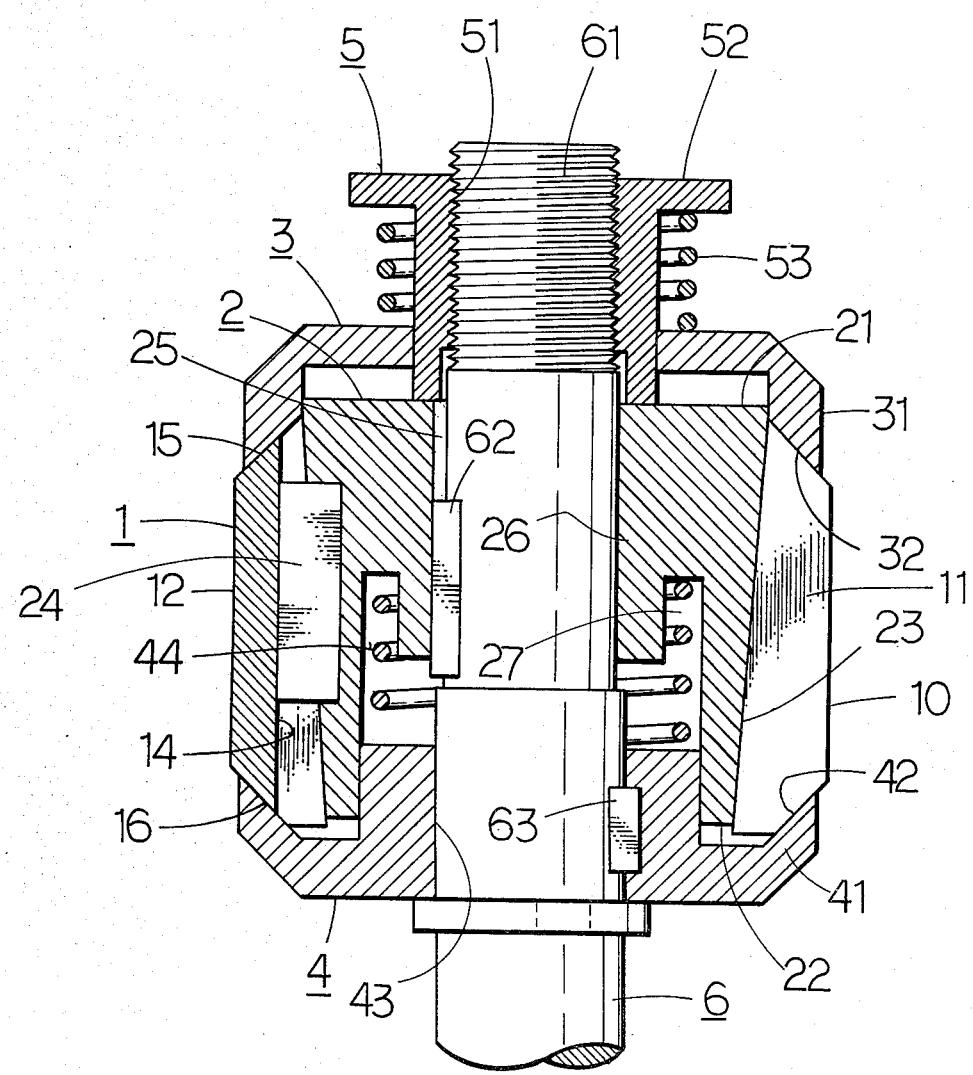
FIG. 2 is an axial cross-section of the drum.

Referring to FIGS. 1 and 2, a preferred embodiment of the variable diameter drum 1 according to the present invention is shown as comprising a rotating shaft 6, a supporting ring 4 fixedly mounted on the shaft, a frusto-conical barrel 2 slidably mounted on the shaft above the supporting ring 4, a plurality of cylinder segments 10 circumferentially arranged around the frusto-conical barrel 2, a uniting ring 3 freely mounted on the shaft above the frusto-conical barrel and the cylinder segments, and a collar 5 screwed on the shaft above the uniting ring. These members have a common axis.

The cylinder segments 10 are obtained by dividing a hollow cylinder along a plurality of axially and radially extending planes. The segments 10 each have two cut or side surfaces 11 extending along different adjoining dividing planes, an outer arc surface 12, an inner arc surface 13, an outwardly bevelled upper surface 15, and an outwardly bevelled lower surface 16. The segments 10 form an integral cylinder when they are joined together with the adjacent side surfaces 11 abutting one another. The outer arc surfaces 12 of the joined segments 10 form a continuous outer cylindrical surface which serves as a drum surface.

On the other hand, the inner arc surfaces 13 of the joined segments 10 form a continuous inner conical surface which is axially upwardly diverged with respect to the axis. The segment 10 is provided with a channel 14 axially extending therethrough at the center of the inner arc surface 13. The upper surface 15 intersects with the outer surface 12 at an obtuse angle. The outwardly bevelled upper surfaces 15 then form a continuous frusto-conical surface when the segments are joined together. This also applies to the outwardly bevelled lower surfaces 16.

The inverse frusto-conical barrel 2 has upper and lower circumferentially extending surfaces 21 and 22, the upper surface 21 being larger in diameter than the lower surface 22, and has a frusto-conical outer surface 23 which is axially upwardly diverged with respect to the axis. The barrel 2 is provided at the outer surface 23 with a plurality of axially extending guide plates 24. The number of the guide plates 24 is equal to that of the segments 10. The outer edge of the guide plate 24 extends parallel to the axis as does the bottom of the channel 14 in the segment 10. The guide plates 24 fit in the axial channels 14 in the segments 10, respectively, when the segments 10 are circumferentially arranged around the barrel 2. In addition, the barrel 2 is provided with an annular recess 27 extending from the bottom 22 to an intermediate point along the axial length of the barrel.

A set of cylinder segments 10 and the barrel 2 are arranged between the upper uniting ring 3 and the lower support ring 4. The uniting ring 3 is provided for the purpose of uniting the freely arranged segments 10 into an integral cylinder. The uniting ring 3 includes an annular rim 31 extending axially downward from the outer periphery of the ring and having an inwardly bevelled lower surface 32. A concentric hole 33 is formed in the ring 3 through which the collar 5 passes. The inwardly bevelled lower surface 32 of the ring 3 is brought into close contact with the outwardly bevelled upper surfaces 15 of the segments 10 to hold the segments when the ring 3 is forced downward.

The lower support ring 4 on which a set of the cylinder segments 10 and the barrel 2 are arranged includes an annular rim 41 extending axially upward from the outer periphery of the ring and having an inwardly bevelled upper surface 42. Specifically, the bevelled lower surfaces 16 of the segments 10 mate with the upper surface 42 of the support ring 4. A hole 43 is formed in the support ring 4 at the center through which the rotating shaft 6 extends.

The rotating shaft 6, which is driven by suitable drive means (not shown), has a threaded portion 61 at the top. A key 62 protrudes from the shaft 6 below the threaded portion and another key 63 protrudes from the shaft 6 below the key 62.

The support ring 4 is fixedly secured to the shaft 6 by means of the key 63. The frusto-conical barrel 2 is mounted on the shaft 6. Since the guide key 62 is in loose fit in an axial channel 25 in a central bore 26 of the barrel 2, the frusto-conical barrel 2 is axially slidable along the shaft 6. A coil spring 44 is seated between the bottom of the annular recess 27 and the upper surface of the support ring 4 such that the barrel 2 is always biased upward.

The uniting ring 3 is loosely mounted on the shaft 6 and placed over the cylinder segments 10 and barrel 2. The collar 5 having a threaded bore 51 and a radially extending flange 52 is screwed on the threaded portion 61 of the shaft 6 and passes through the hole 33 in the uniting ring 3. A coil spring 53 is seated between the flange 52 and the ring 3.

The thus assembled drum operates as follows:

When it is desired to increase the diameter of the drum 1, the collar 5 is moved downward by turning it forward. The collar 5 with the lower end abutting the top of the frusto-conical barrel 2 then moves the barrel 2 downwardly. The inverse frusto-conical surface 23 of the barrel urges the cylinder segments 10 outwardly in their radial directions. As a result, the diameter of the drum defined by a set of outer arc surfaces 12 of the cylinder segments 10 is enlarged.

After enlargement, the configuration of the cylinder segments 10 is stable as the uniting ring 3 is positively held by the action of the spring 53. The circumferentially arranged segments 10 are prevented from being randomly located. In this respect, more preferably, fastening means in the form of a bolt may be provided for securing the collar 5 to the shaft 6 to ensure the stable configuration of the cylinder segments 10 arranged at their outer position.

At the time of diameter enlargement, the cylinder segments 10 are spaced apart at short intervals. However, it has been found that such small spacings do not create any problem during the actual operation of the drum.

When it is desired to reduce the diameter of the drum 1, the collar 5 is moved upward by turning it reversely. Then the frusto-conical barrel 2 is raised by the action of the spring 44. The diameter of the drum is smoothly reduced as the uniting ring 3 is spring-biased against the bevelled upper surfaces 15 of the segments 10 to converge the segments 10.

The cylinder segments are translated solely in their radial directions as they are slidably held between the bevelled surfaces 32 and 42 of the upper and lower rings 3 and 4. During this translation, the outer surfaces of the cylinder segments 10 are always kept parallel to the axis as the bottom of the segment channel 14 and the associated edge of the guide plate 24 are parallel to the axis.

As described above, the diameter of the drum defined by a set of the outer arc surfaces of the cylinder segments may be increased or reduced by a simple adjustment in a smooth manner.

When any suitable roller having a rubber surface covering is placed in tangential contact with the variable diameter drum of the present invention, the revolution rate of the roller may be changed by adjusting the diameter of the drum.

Furthermore, a great skill is required to accurately machine a drum. The use of the variable diameter drum of the present invention permits the diameter of the drum to be adjusted to a desired value after it is assembled in a suitable system.

What is claimed:

1. A variable diameter drum comprising:
   a rotating shaft;
   a plurality of separate cylinder segments circumferentially arranged around the shaft and each having an outer arc surface and outwardly beveled upper and lower surfaces such that lines extended parallel to said upper and lower surfaces would meet above said outer arc surface, the outer arc surfaces of said cylinder segments forming a substantially continuous cylindrical surface when said cylinder segments are joined together;
   means for holding said cylinder segments, but allowing said cylinder segments to translate in their radial directions, said holding means including a lower ring secured to the shaft and an upper ring mounted for axial motion on the shaft and biased toward the lower ring, said cylinder segments being interposed between the lower and upper rings, said lower ring having an inwardly bevelled upper surface mating with said outwardly bevelled lower surfaces of said cylinder segments, and said upper ring having an inwardly bevelled lower surface mating with said outwardly bevelled upper surfaces of said cylinder segments; and
   means for adjusting the position of said cylinder segments in their radial directions.

2. A drum according to claim 1 wherein said adjusting means includes a frusto-conical barrel mounted for axial motion between the shaft and said cylinder segments.

3. A drum according to claim 2 wherein each of said cylinder segments is keyed to the frusto-conical barrel such that the outer surface of said cylinder segment is kept parallel to the axis of the shaft.

4. A drum according to claim 2 wherein said adjusting means further includes a collar adjustably screwed on the shaft and having a lower end in engagement with said frusto-conical barrel.

5. A drum according to claim 4 wherein said holding means further includes a spring seated between said upper ring and said collar.

6. A drum according to claim 5 wherein said adjusting means further includes another spring seated between said frusto-conical barrel and said lower ring.

* * * * *